United States Patent Office 3,767,743
Patented Oct. 23, 1973

3,767,743
METHOD FOR PREPARING MICROCELLULAR POLYURETHANE ELASTOMERS WITH INTEGRAL SKINS USING A COMBINATION OF TERTIARY AMINE, ORGANOMERCURY COMPOUND, AND ORGANOLEAD AS CATALYST
Fritz Hostettler, Freehold, N.J., and George W. Huffman, Crystal Lake, Ill., assignors to The Quaker Oats Company, Chicago, Ill.
No Drawing. Filed Jan. 12, 1972, Ser. No. 217,279
Int. Cl. C08g 22/44
U.S. Cl. 264—48  6 Claims

ABSTRACT OF THE DISCLOSURE

This invention relates to a method for preparing microcellular elastomers having integral skins which are substantially non-porous, said method comprising contacting a mixture of specified polyols with methylene bis(4-phenyl-isocyanate) in the presence of a blowing agent and a catalyst system consisting of a tertiary amine, an organomercury compound, and an organolead compound.

BACKGROUND OF THE INVENTION

Field of the invention

This invention concerns a novel process for the preparation of certain microcellular elastomers with integral skins which are substantially non-porous.

Description of the prior art

One of the most significant contributions to the growth of polyurethane technology in recent years is the development of microcellular polyurethane elastomers with integral skins. Integral skin microcellular elastomers, when molded, form their own tough skin which takes on the exact pattern of the mold. This eliminates the separate process of encapsulating the microcellular elastomer in a skin after its formation. A considerable savings in labor cost is thus realized.

Various methods have been proposed to fabricate microcellular polyurethane elastomers with integral skins. U.S. Pat. No. 3,527,852 discloses one such method. The latter scheme relies on rotating the mold to produce the integral skin. It is apparent that it would be highly desirable to provide a method of manufacturing microcellular polyurethane elastomers with integral skins which does not require the rotation, rocking, agitation, etc., of the mold.

Most microcellular polyurethane elastomers with integral skins have been made with chlorinated aromatic diamines, modified diphenylmethane diisocyanate or quasi-prepolymers of toluene diisocyanate to obtain the necessary skin properties to resist abuse. These systems based on aromatic diamines are highly reactive, yielding very short handling times and are also expensive. Quasi-prepolymer systems require an extra step. Often these elastomers tend to discolor top protective coatings. Consequently, many searchers have looked for systems which contain no chlorinated aromatic diamine but produce an elastomer with a tough skin which is substantially non-porous.

SUMMARY OF THE INVENTION

It is an object of this invention to provide an improved and simple method for preparing certain microcellular polyurethane elastomers with integral skins wherein the mold is not rocked.

Another object of this invention is to provide a method of manufacturing certain microcellular polyurethane elastomers with integral skins which eliminates the use of chlorinated aromatic diamines.

Still another object of this invention is to provide a process whereby the product elastomer has an integral skin which is substantially non-porous.

Yet another object of this invention is to provide a process whereby large molded articles can be demolded within about 10 minutes.

The objects of this invention are accomplished by a method for preparing microcellular polyurethane elastomers which comprises the sequential steps of (a) contacting under substantially anhydrous conditions:
  (1) 10 to 50 percent by weight of the total polyether glycol of a polytetramethylene ether glycol having an average molecular weight between about 500 and about 2000;
  (2) 90 to 50 percent by weight of the total polyether glycol of a polypropylene ether glycol having an average molecular weight between about 500 and about 2000; and
  (3) a simple polyol having an average molecular weight below about 500 simultaneously with methylene bis(4-phenylisocyanate) in the presence of a catalyst system consisting of a tertiary amine, an organolead compound, and an organomercury compound; and in the presence of a blowing agent which vaporizes under the contacting conditions;

(b) pouring the contacted mixture into a mold which is preheated to a temperature between about 30° C. and 55° C.;

(c) permitting the contents of the mold to cure in contact with the mold; and (d) removing the resulting self supporting microcellular polyurethane elastomer with integral skin from the mold.

In our process for the preparation of microcellular polyurethane elastomers we use a combination of 10 to 50 percent by weight of the total polyether glycol of a polytetramethylene ether glycol having an average molecular weight between about 500 and about 2000 and 90 to 50 percent by weight of the total polyether glycol of a polypropylene ether glycol having an average molecular weight between about 500 and about 2000.

The total polyether glycol refers to the combined amount of the polytetramethylene ether glycol and the polypropylene ether glycol. We have found it convenient to prepare a mixture of the polyether glycols which is subsequently contacted with a simple polyol and the methylene bis(4-phenylisocyanate). As the average molecular weight of the polytetramethylene ether glycol approaches 1000, we prefer to liquify the polytetramethylene ether glycol by warming it slightly before adding it to the polypropylene ether glycol.

It is preferred that the polytetramethylene ether glycol and polypropylene ether glycol utilized in accordance with this invention have an average molecular weight between 600 and 1500. If the polyether polyols have average molecular weights in the preferred range, they will form a compatible mixture when blended in the above mentioned proportions. Compatibility is to be taken to mean that the blend will not separate into separate phases at room temperature. Throughout this application room temperature is to be taken to mean about 26° C.

The term "simple polyol" is used herein to describe low molecular weight polyols such as those consisting of alkyl and hydroxyl groups, e.g., 1,4-butanediol, ethylene glycol, diethylene glycol, or the like. The amount of simple polyol used in our process should be about 1 to 4 moles to 1 mole of the total polyether glycol.

In addition to the simple polyols described above in order to obtain the crosslinking necessary to entrap the blowing agent and to provide a high quality microcellular polyurethane elastomer, it may be necessary to employ some polyfunctional material as part of the simple polyol.

Representative low molecular weight polyfunctional polyols include saturated aliphatic monomeric polyols such an trimethylol propane; glycerol; 1,2,4-butanetriol; 1,2,6-hexanetriol; and pentaerythritol. Other representative polyfunctional polyols include triethanolamine. The above polyfunctional polyols contain 3 to 4 hydroxyl groups and are preferred in order to obtain the best physical properties in the resultant microcellular elastomer. As is well known in the art, the amount of polyfunctional polyol, when used, may be varied widely depending on the stiffness of the microcellular elastomer desired. Usually small amounts of the total simple polyol should be polyfunctional material.

The methylene bis(4-phenylisocyanate) may be crude MDI such as "Isonate 390-P" sold by Upjohn Company, Kalamazoo, Mich.; chemically pure MDI; or liquid MDI such an "Isonate 143-L" also sold by Upjohn Company. "Isonate 143-L" is MDI wherein a sufficient number of the isocyanate groups have been converted to carbodiimide to render the MDI fluid. We prefer to use liquid MDI but solid MDI, either crude or pure, may be used if preheated to about 45–50° C. and contacted as a liquid with the polyether polyols and simple polyol. The amount of methylene bis(4-phenylisocyanate) is approximately the theoretical number of equivalents of isocyanate necessary to react with the total number of equivalent of hydroxyl in the simple polyol and in the total polyether polyol. We have found that between 0.9 and 1.1 of the theoretical amount is satisfactory in most cases.

The selection of the catalyst system in the practice of our process is critical. For example we have found that a combination of tertiary amines and organotin compounds is unsatisfactory because it provides a too rapid rise time. The rise time is the time necessary for the foam to reach its maximum size. The foam rose so quickly in the mold that there was insufficient time without rotating the mold for the elastomer to wet-out the mold and form a skin. The resulting microcellular polyurethane elastomer above the original pour line had an undesirable pocked surface.

In view of the above, we began to look for a catalyst which would provide a slower rise time. This proved to be a difficult undertaking since catalysts providing slower rise times also resulted in unsatisfactorily long demolding time. The demolding time is the time necessary for the microcellular elastomer to become sufficiently cured that it will not slump when demolded and left unsupported. For example, a tertiary amine in combination with a delayed action metal catalyst such as an organomercury compound or a trialkyltin acylate provided unduly long demolding times.

Unexpectedly we found that a combination of tertiary amines, organomercury compounds, and organolead compounds gave us a desirable rise time and demolding time. Suitable tertiary amines consist of alkyl tertiary amines such as tripropylamine; acyclic tertiary amines such as N,N-dimethylcyclohexylamine; and heterocyclic tertiary amines such as N-methyl morpholine, N-ethyl morpholine, N-methyl piperidine, and N-ethyl piperdine.

Satisfactory organolead compounds for example are lead salts of organic acids such as lead acetate, lead naphtenate, lead octoate, lead benzoate, lead salicylate, etc. Suitable organomercury compounds are, by way of example, phenyl and cresyl mercuric salts of aliphatic acids having between 2 and 12 carbon atoms. Where the aliphatic acid contains three or more carbon atoms, the carbon chain may be straight or branched. Satisfactory organomercury compounds are for example phenyl mercuric acetate, phenyl mercuric propionate, phenyl mercuric butyrate, phenyl mercuric laurate, p-cresyl mercuric propionate, m-cresyl mercuric propionate, etc. We prefer to use lead octoate as the organolead compound and phenyl mercuric propionate as the organomercury compound.

The tertiary amine catalyst is present in an amount sufficient to provide a slow even rise. We prefer a rise time of about 40 to 70 seconds. For most purposes about 0.05 to 0.25 percent by weight of tertiary amine based on the total weight of the total reactants (isocyanate, simple polyol, and polyether glycol mixture) is sufficient to give a satisfactory rise time. The amount of organomercury compound and organolead compound sufficient to give a demolding time less than about 10 minutes is generally about 0.1 to 0.5 percent by weight and about 0.05 to 0.25 percent by weight, respectively, based on the weight of the total reactants.

The foaming operation is effected by means of a blowing agent which vaporizes under the contacting conditions. Preferred blowing agents are methylene dichloride trichlorofluoromethane, and 1,2,2-trichloro-1,1,2-trifluoroethane.

Increasing the fluorocarbon blowing agent will decrease the microcellular polyurethane elastomer density up to a point. As is known in the art at some point the evaporation of the blowing agent consumes too much exothermic heat, causing insufficient blowing and improper cure. The density of the resultant microcellular polyurethane elastomer should be between about 20 and 50 pounds per cubic foot. To produce a microcellular polyurethane elastomer with a density of 45 pounds per cubic foot for example we have found that 1 percent by weight of methylene dichloride is sufficient blowing agent.

Optional additives such as stabilizers, fillers, colorants, processing aids, surfactants, lubricants, plasticizers, etc., can be incorporated into the microcellular polyurethane elastomer prepared by our process if desired.

In practicing our process the polyether polyols, simple polyol, catalyst system, and blowing agent are contacted simultaneously with the isocyanate under substantially anhydrous conditions. By substantially anhydrous conditions we mean that no more than 0.1 percent by weight of water based on te weight of the total reactants be present. The contacting is at ambient temperature, usually around 26° C. The reaction mixture is dumped into a mold which is heated to a temperature between 30° C. and 55° C. After curing at ambient temperature for about 10 minutes, the microcellular elastomer is removed from the mold and may be heat aged in some cases to improve its properties.

The contacting may be accomplished by rapid hand mixing or by mixing in a foaming machine. Any or all of the polyols, i.e., polyether glycols or simple polyol, may be premixed. The catalyst system may also be premixed with any or all of the polyols. We prefer either of the following techniques: Polyether polyols, simple polyol, catalyst system, and the blowing agent are mixed and pumped into a mixing head. Isocyanate is also pumped into the mixing head in a separate stream and is thoroughly mixed with the first stream by a stirrer present in the head.

Alternatively, the blowing agent, organolead compound and organomercury compound, may be mixed in a part of the polyether polyol and introduced into the mixing head in a third stream.

In either case, from the mixing head the material is deposited into a heated mold which is moved relative to the mixing head in order to provide a layer of reactants on the bottom thereof. Thus, it is apparent that the process of our invention can be used with any of the usual mixing procedures of making microcellular polyurethane elastomers without requiring expensive and undesirable alterations.

The products of the process of the present invention are useful as microcellular elastomers. These products have an integral skin which is virtually pore free. As used herein "pore free" means that the skin has substantially no pores which are visible under 6 powers of magnification. The presence of a substantially number of pores having a size substantially greater than that set forth above is most undesirable for many applications. For example, automobile bumpers must be substantially impervious to the penetration of water and chemicals, e.g., during winter freeze-thaw conditions if satisfactory useful life to be enjoyed. Also, the presence of a substantial number of pores greater than those visible under 6 powers of magnification presents an extremely difficult finishing problem.

Some specific examples of useful articles which can be made by our process are: auixilary springs, truck dock pads, gaskets, vibration isolators, shoe soles, tires and automobile bumpers.

DESCRIPTION OF THE PREFERRED EMBODIMENTS

The following examples are shown for the purpose of illustrating and demonstrating the invention. It will be apparent to those skilled in the art that various changes and modifications may be made therein without departing from the spirit and scope of the invention as it is more precisely defined in the subjoined claims.

In the following examples, parts and percentages are by weight unless otherwise indicated. Room temperature is to be taken to mean about 26° C.

Example 1

25 parts of polytetramethylene ether glycol having an average molecular weight of 1000 which had been warmed at about 38° C. until it became liquid was blended with 75 parts of polypropylene ether glycol having an average molecular weight of 1225. To this blend was added 14.1 parts of 1,4-butanediol, 0.2 part of N,N-dimethylcyclohexylamine, 0.5 part of phenyl mercuric propionate, 0.2 part of lead octoate, and 2.0 parts of methylene dichloride.

The polyols, blowing agent, and catalyst system were machine mixed with 71.1 parts of "Isonate 143–L" and then poured into a mold which had been preheated to 55° C. The microcellular elastomer was found to have a cream time of 20 seconds, a rise time of 60 seconds, a tackfree time of 75 seconds, and a demolding time of 10 minutes. The cream time is the time necessary for the elastomer to begin to form and the tackfree time is the time necessary for the elastomer to be sufficiently cured to not be sticky to the touch. The microcellular elastomer was cured for 16 hours at 70° C. after demolding.

On cure the product was found to have a well formed integral skin of approximately 1 mm. thickness which was uniformly formed around the microcellular elastomer and which had no substantial number of pores which were visible under 6 powers of magnification. The density of the material was 45 to 48 pounds per cubic foot. 6" x 12" x 0.5" test specimen of the above product were found to have the following physical properties:

Hardness Shore A of 75 (ASTM D676–59T); tensile strength at break point of 745 p.s.i. (ASTM D1564); elongation at break point of 235 percent (ASTM D412–61T); tear split of 35 p.l.i. (modification of D1564, sample thickness was ½" as opposed to 1"); tear die C of 107 p.s.i. (ASTM D624), and compression load deflection of 750 lbs./in.² (ASTM D575, Method A at 50 percent deflection).

EXAMPLE 2

Using the formulation of Example 1 except that polypropylene ether glycol having an average molecular weight of 1225 was substituted for the polytetramethylene ether glycol, it was observed that the rate of cure of the resultant microcellular elastomer was slow when compared with the product of Example 1. For example, it was found that microcellular elastomers prepared with polypropylene ether glycol alone remained mushy on the inside for more than one hour after demolding. This lead frequently to internal cracking of the demolded part. This example clearly demonstrates the benefit of having polytetramethylene ether glycol as part of the formulation in the method of our invention.

From the foregoing description we consider it to be clear that the present invention contributes a substantial benefit to the polyurethane art.

We claim:
1. A method for preparing microcellular polyurethane elastomers which comprises the sequential steps of
 (a) contacting under substantially anhydrous conditions:
  (1) 10 to 50 percent by weight of the total polyether glycol of a polytetramethylene ether glycol having an average molecular weight between about 500 and about 2000;
  (2) 90 to 50 percent by weight of the total polyether glycol of a polypropylene ether glycol having an average molecular weight between about 500 and about 2000; and
  (3) a simple polyol having an average molecular weight below about 500
 simultaneously with methylene bis(4-phenylisocyanate) in the presence of a catalyst system consisting of a tertiary amine, an organolead compound, and an organomercury compound, said tertiary amine being selected from the group alkyl, acyclic, and heterocyclic tertiary amines, said organolead compound being a lead salt of an organic acid, said organomercury compounds being phenyl and cresyl mercuric salts of aliphatic acids having between 2 and 10 carbons; and in the presence of a blowing agent which vaporizes under the contacting conditions;
 (b) pouring the contacted mixture into a mold which is preheated to a temperature between about 30° C. and 55° C.;
 (c) permitting the contents of the mold to cure in contact with the mold; and
 (d) removing the resulting self-supporting microcellular polyurethane elastomer with integral skin from the mold.

2. The method of claim 1 wherein the total polyether glycol comprises 20 to 30 percent by weight of polytetramethylene ether glycol and 80 to 70 percent by weight of polypropylene ether glycol.

3. The method of claim 1 wherein the catalyst mixture consists of 0.05 to 0.25 percent by weight of the tertiary amine; 0.1 to 0.5 percent by weight of the organomercury compound; and 0.05 to 0.25 percent by weight of the organolead compound, based on the weight of the total reactants.

4. The method of claim 1 wherein the catalyst mixture consists of 0.05 to 0.25 percent by weight of the tertiary amine N,N-dimethylcyclohexylamine; 0.1 to 0.5 percent by weight of the organomercury compound phenyl mercuric propionate and 0.05 to 0.25 percent by weight of the organolead compound lead octoate, based on the weight of the total reactants.

5. The method of claim 1 wherein the simple polyol and the total polyether glycol are in the molar ratio about 1:1 to 4:1.

6. The method of claim 1 wherein the simple polyol is selected from the group consisting of 1,4-butanediol, ethylene glycol, and diethylene glycol.

References Cited

UNITED STATES PATENTS 3,201,358  8/1965  Hostettler et al. __ 260—77.5 AC
3,670,070  6/1972  Appleton _____ 260—2.5 AC

OTHER REFERENCES

Wirtz: J. Cellular Plastics, September/October 1969, pp. 304–309.

DONALD E. CZAJA, Primary Examiner

M. J. WELSH, Assistant Examiner

U.S. Cl. X.R.

260—2.5 AB, 2.5 AC, 2.5 AP, 2.5 AZ, 77.5 AC; 264—53